(12) United States Patent
Kawanabe

(10) Patent No.: US 7,187,723 B1
(45) Date of Patent: Mar. 6, 2007

(54) LOCAL OSCILLATION SIGNAL SUPPLY METHOD AND CIRCUIT THEREFOR

(75) Inventor: Yoshitaka Kawanabe, Saitama (JP)

(73) Assignee: NEC Corporation, Tokyo (JP)

( * ) Notice: Subject to any disclaimer, the term of this patent is extended or adjusted under 35 U.S.C. 154(b) by 821 days.

(21) Appl. No.: 10/088,689

(22) PCT Filed: Sep. 22, 2000

(86) PCT No.: PCT/JP00/06494

§ 371 (c)(1),
(2), (4) Date: Mar. 21, 2002

(87) PCT Pub. No.: WO01/22605

PCT Pub. Date: Mar. 29, 2001

(30) Foreign Application Priority Data

Sep. 24, 1999 (JP) .................................. 11/269831

(51) Int. Cl.
*H03K 9/00* (2006.01)
(52) U.S. Cl. ...................... 375/316; 375/134; 342/371; 342/372; 342/382; 455/182
(58) Field of Classification Search ................ 375/342, 375/134, 316; 342/372, 371, 382; 455/182
See application file for complete search history.

(56) References Cited

U.S. PATENT DOCUMENTS

| | | | |
|---|---|---|---|
| 5,061,937 A | | 10/1991 | Ozeki et al. |
| 5,428,308 A | * | 6/1995 | Maeda ........................ 327/106 |
| 5,535,441 A | * | 7/1996 | Jackson et al. .......... 455/182.2 |
| 5,585,803 A | * | 12/1996 | Miura et al. ................ 342/372 |
| 5,620,608 A | | 4/1997 | Rosa et al. ................. 210/739 |
| 5,715,275 A | * | 2/1998 | Emi ........................... 375/134 |

FOREIGN PATENT DOCUMENTS

| | | |
|---|---|---|
| EP | 0 623 357 A1 | 11/1994 |
| JP | 60-148237 | 8/1985 |
| JP | 01-279639 | 11/1989 |
| JP | 02-065421 | 3/1990 |

(Continued)

*Primary Examiner*—Chieh M. Fan
*Assistant Examiner*—Eva Zheng
(74) *Attorney, Agent, or Firm*—Foley & Lardner LLP

(57) ABSTRACT

With the object of accurately reproducing, by means of a small-scale circuit, differences in propagation delay at antennas of received signals that are received as input by way of each of a plurality of receivers, frequency data generator 6 supplies frequency data that contain a frequency component that is synchronized in common to the plurality of receivers 2-1 to 2-n. At receiver 2-n, local oscillation signal generator 3-n, which is represented by a D/A converter, generates a local oscillation signal from frequency data that have been synchronized in common. The passing phase of a received signal that is outputted from antenna 1-n by way of receiver 1-n is thus fixed, and as a result, the phase difference of received signals that are received by DSP 8 by way of the plurality of receivers 2-1 to 2-n becomes the propagation delay difference of the received signals. As frequency data, frequency data that contain a plurality of frequency components are supplied to each receiver 2-n, and the frequency data are selected inside receiver 2-n and subjected to quadrature modulation to enable generation of local oscillation signals of differing intermediate frequencies.

4 Claims, 6 Drawing Sheets

FOREIGN PATENT DOCUMENTS

| | | |
|---|---|---|
| JP | 02-193088 | 7/1990 |
| JP | 03-220803 | 9/1991 |
| JP | 04-088729 | 3/1992 |
| JP | 09-130361 | 5/1997 |
| JP | 2000-295169 | 10/2000 |
| WO | WO98/35747 | 8/1998 |

* cited by examiner

LOCAL OSCILLATION SIGNAL SUPPLY METHOD AND CIRCUIT THEREFOR

BACKGROUND OF THE INVENTION

1. Field of the Invention

The present invention relates to a method and a circuit for supplying local oscillation signals that are used in the demodulation and output by a digital signal processor of received signals of a plurality of receivers that are each connected to a respective antenna, and more particularly to a method and circuit for supplying local oscillation signals for accurately reproducing the differences in propagation delay of signals that have been received at antennas.

2. Description of the Related Art

Local oscillation signals are used in receivers for converting frequency. In a method and circuit of the prior art for supplying local oscillation signals, an oscillator that generates a local oscillation signal is provided for each of a plurality of receivers that are each provided with a respective antenna, and local oscillation signals are thus independently supplied to each receiver.

In a configuration in which local oscillation signals are independently supplied to receivers in this way, however, the phases of these local oscillation signals are not fixed, and such a configuration therefore cannot be applied in cases such as an adaptive array antenna system that requires the accurate detection of the phase component in the received signals of antennas.

The prior-art example shown in FIG. 1 is the configuration shown in Japanese Patent Laid-open No. 224138/1998. Receivers 102-1 to 102-n each apply, as input to mixers 103-1 to 103-n that perform frequency conversion: received signals that have been received from antennas 101-1 to 101-n that are provided for each of receivers 102-1 to 102-n; and a local oscillation signal from local oscillator 104 that is provided in common to receivers 102-1 to 102-n. The output of each of mixers 103-1 to 103-n is sent by way of A/D (analog/digital) converters 105-1 to 105-n to DSP (digital signal processor) 106.

When a local oscillation signal is received from a local oscillator as in the example shown in FIG. 1, however, the occurrence of phase error that arises from the time delays caused by differences in wiring length cannot be avoided.

As a countermeasure against the occurrence of phase error and the consequent disqualification for application in cases in which the accurate detection of the phase component is required, there exists a common synthesizer method in which oscillators are provided for each channel and local oscillation signals are distributed to each receiver, but the resulting large scale of the device is problematic.

Of the methods and circuits for supplying local oscillation signals of the above-described prior art, whether local oscillation signals are independently generated for the mixers of each respective receiver or a local oscillator is shared between a plurality of receivers as shown in FIG. 1, the lack of phase control for the input signals that are applied to the mixers results in the inability to avoid phase error of the local oscillation signals that are used in frequency conversion, and the differences in propagation delay of the received signals that are received from each of a plurality of receivers therefore cannot be accurately reproduced. The problem therefore exists that accurate control based on phase cannot be achieved. This inability prevents application to systems that require accurate phase control, such as an adaptive array antenna system.

The shared synthesizer method for solving this type of problem entails a complex configuration in which an oscillator is provided for each channel and local oscillation signals are distributed to each receiver, and therefore has the problem of entailing a large-scale device.

SUMMARY OF THE INVENTION

It is an object of the present invention to provide a local oscillation signal supply method and circuit that solve the above-described problems and that, by means of a small-scale circuit, enable accurate reproduction of propagation delay differences in antennas of received signals that are received by way of each of a plurality of receivers.

The local oscillation signal supply method according to the present invention is used when employing a digital signal processor (DSP) to demodulate and output received signals that are received by way of a plurality of receivers that are each connected to respective antennas; this method including steps of: generating frequency data that contain a frequency component that is to be the local oscillation signal and sending these frequency data as a common signal source to the plurality of receivers by way of a single signal sequence that corresponds to a wireless channel, and further, at each of the receivers, generating local oscillation signals in which phase and amplitude are matched at all of the receivers based on the frequency data that have been supplied.

The local oscillation signal supply circuit according to the present invention includes: a single frequency data generator that generates frequency data that contain a frequency component that is to be a local oscillation signal and sends these data as a common signal source to the plurality of receivers by way of a single signal sequence that corresponds to a wireless channel; and, at each of the receivers, a local oscillation signal generator that generates a local oscillation signal in which phase and amplitude are matched at all of the receivers based on the frequency data that have been received from the frequency data generator.

By means of this construction, a local oscillation signal having phase and amplitude that are matched with other receivers is generated at each of the receivers, and as a result, differences in propagation delay at antennas for a received signal that is received by way of each of a plurality of receivers can be accurately reproduced.

As one specific method for the above-described generation of local oscillation signals, the signal source that is supplied is a digital signal, this digital signal is converted to an analog signal based on a clock signal that is common to all of the receivers to generate the local oscillation signal, whereby data that are synchronized in common and a signal can be generated by digital processing.

In one example of a specific circuit, a frequency data generator outputs frequency data by means of a digital signal, and the local oscillation signal generators of the receivers include digital/analog converters that, based on a clock signal that is common to all of the receivers, convert the digital signal to an analog signal and output the result.

An increase in circuit scale can be avoided by means of this type of construction.

In the local oscillation signal supply method, a plurality of the signal sequences are provided each having different frequency data, and frequency data that are received from each of the plurality of the signal sequences are subjected to quadrature amplitude modulation to generate a local oscillation signal having a prescribed frequency. More specifically, a plurality of the signal sequences supply shift data, which correspond to phase advance data for the frequency data, to all of the receivers; and in the receivers, shift data in which a desired frequency is obtained from each of the plurality of signal sequences are selected and signals converted, and the selected and converted shift data and the frequency data are subjected to quadrature amplitude modulation to generate a local oscillation signal having a desired frequency.

In a local oscillation signal supply circuit, the local oscillation signal generator of a receiver is provided with a quadrature modulator that performs quadrature amplitude modulation of frequency data that are applied from each of a plurality of signal sequences to generate a local oscillation signal having a desired frequency. More specifically, frequency data generators are provided with a plurality of signal sequences for outputting to all of the receivers shift data that correspond to phase advance data for the frequency data. The receivers are provided with: a selector/converter that selects shift data, in which a desired frequency is obtained from the plurality of signal sequences, from the signal sequences and performs signal conversion; and a quadrature modulator that performs quadrature amplitude modulation of the selected and converted shift data and the frequency data to generate a local oscillation signal having a desired frequency.

DETAILED DESCRIPTION OF THE PREFERRED EMBODIMENTS

We now refer to the accompanying figures to describe a working example of the present invention.

Figure 2:
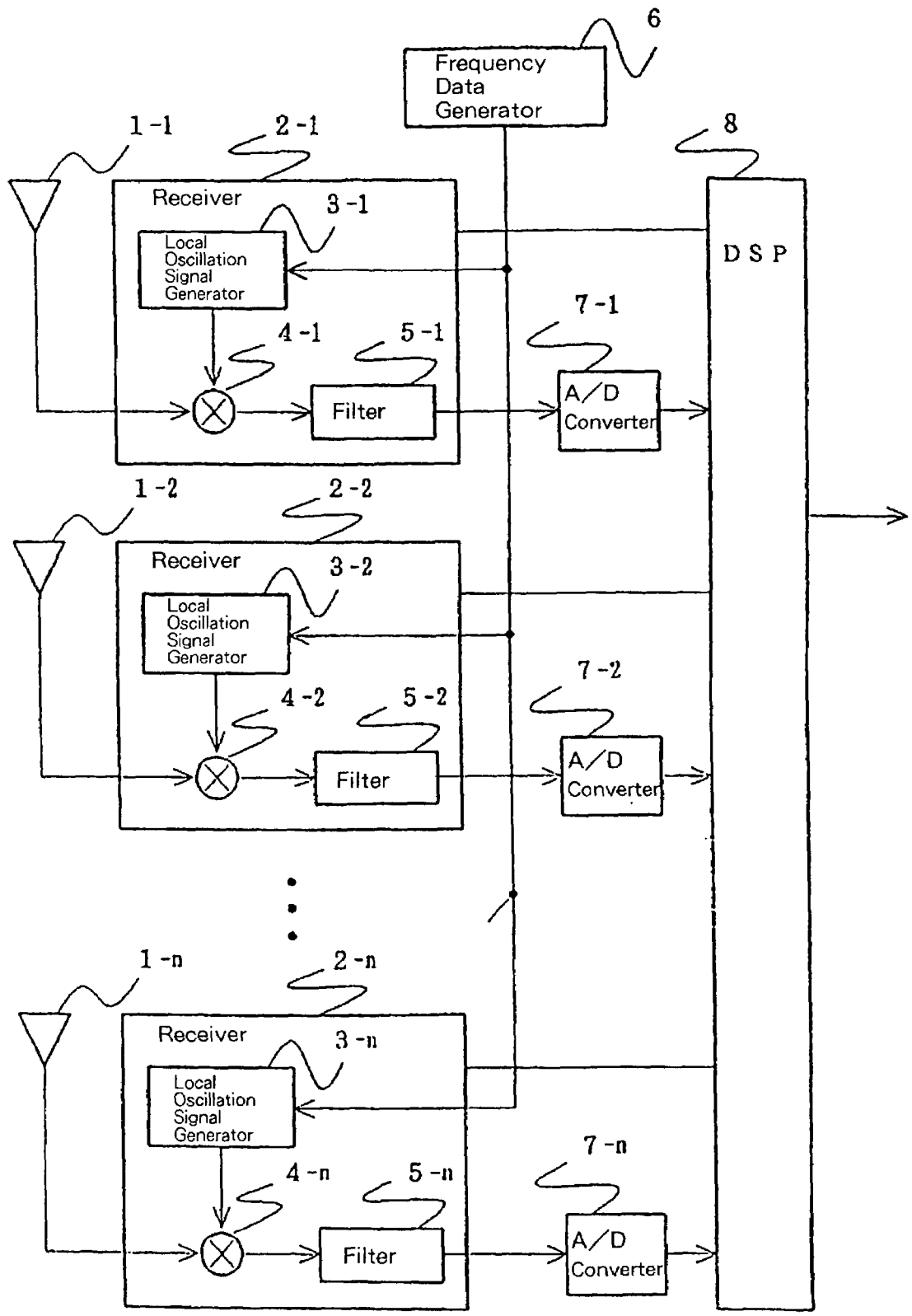
FIG. 2 is a function block diagram showing an embodiment of the present invention.

Referring first to FIG. 2, which is a block diagram showing one construction of a working example of a local oscillation signal supply circuit according to the present invention, a local oscillation signal supply circuit is shown that is constituted by: n receivers 2-1 to 2-$n$ that are respectively provided with antennas 1-1 to 1-$n$; A/D (Analog/Digital) converters 7-1 to 7-$n$ that are provided for each of receivers 2-1 to 2-$n$; and frequency data generator 6 and DSP (Digital Signal Processor) 8 that are provided in common for each of receivers 2-1 to 2-$n$.

Local oscillation signal generators 3-1 to 3-$n$, mixers 4-1 to 4-$n$, and filters 5-1 to 5-$n$ are provided for respective receivers 2-1 to 2$n$. Local oscillation signal generators 3-1 to 3-$n$ receive as input frequency data that contain a frequency component that is generated by frequency data generator 6.

Figure 1:
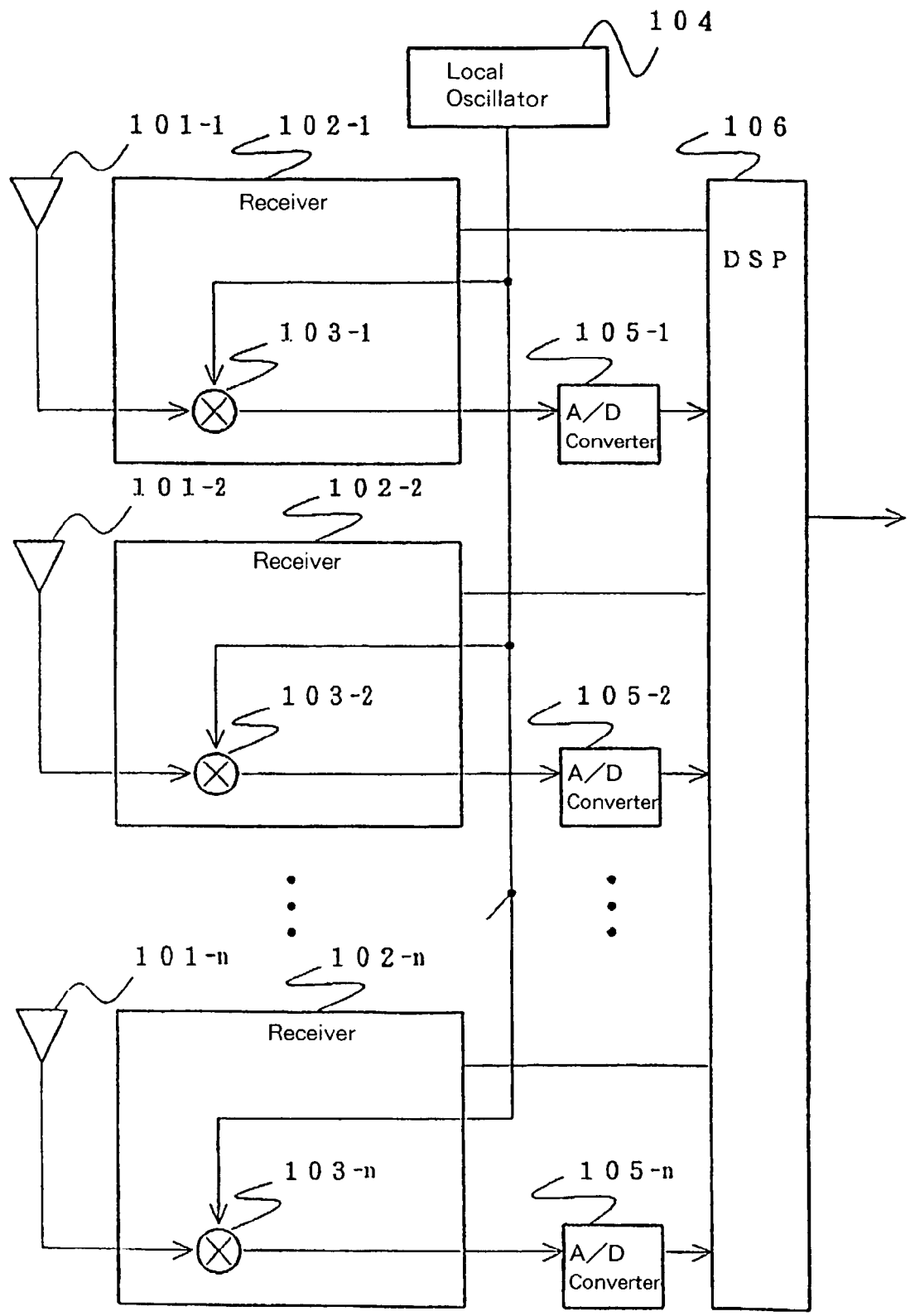
FIG. 1 is a function block diagram showing an example of the prior art.

This working example differs from the example of the prior art shown in FIG. 1 in that local oscillation signal generators 3-1 to 3-$n$ inside receivers 2-1 to 2-$n$ receive frequency data that contain a frequency component from frequency data generator 6 and generate a local oscillation signal that is synchronized with this frequency data.

The basic construction in this working example is next described. However, since DSP 8 for processing signals that have been outputted from receivers 2-1 to 2-$n$ is not directly related to the present invention and has the same constitution as the prior art according to functions, a detailed description regarding this component is here omitted.

If the received frequency has wavelength $\lambda$, antennas 1-1 to 1-$n$ are non-directional antennas arranged at intervals of $\lambda/4$ or more. Local oscillation signal generator 3-$n$ of receiver 2-$n$ that is connected to antenna 1-$n$ generates a local oscillation signal that is synchronized to frequency data that are received from frequency data generator 6, whereby local oscillation signals having matched phase and amplitude are generated at all receivers 2-1 to 2-$n$.

Mixers 4-1 to 4-$n$ are components represented by, for example, DBM (Double Balanced Mixers), and these components convert received signals that are applied as input from antennas 1-1 to 1-$n$ to an IF (Intermediate Frequency) signal using the local oscillation signals that are generated at local oscillation signal generators 3-1 to 3-$n$. Filters 5-1 to 5-$n$ can be represented by, for example, SAW (Surface Acoustic Wave) filters, and these filters suppress unwanted radiation that is emitted from mixers 4-1 to 4-$n$. The output of each of mixers 4-1 to 4-$n$ is outputted to DSP 8 by way of filters 5-1 to 5-$n$ and A/D converters 7-1 to 7-$n$.

Frequency data generator 6 generates data that contain a frequency component and supplies these data to each of local oscillation signal generators 3-1 to 3-$n$ of receivers 2-1 to 2-$n$. A/D converters 7-1 to 7-$n$ receive respective outputs of filters 5-1 to 5-$n$ that are provided in respective receivers 2-1 to 2-$n$, convert these outputs to digital, and send the result to DSP 8. In the case of an adaptive array antenna system, DSP 8 detects the reception delay phase between demodulated signals that have been demodulated from the received signals that have been frequency-converted at receivers 2-1 to 2-$n$.

Referring now to FIG. 2, the operation and functions of the circuit shown in FIG. 2 is explained.

Frequency conversion is carried out for each of the signals that have been received at antennas 1-1 to 1-$n$ at receivers 2-1 to 2-$n$, respectively. The local oscillation signals that are used when carrying out this frequency conversion are generated in local oscillation signal generators 3-1 to 3-$n$ in receivers 2-1 to 2-$n$, respectively, based on frequency data that are supplied from frequency data generator 6. Frequency data generator 6 directly generates a sine wave waveform of the local oscillation signals that are used in frequency conversion, and outputs the frequency data that are supplied to local oscillation signal generators 3-1 to 3-$n$.

The frequency data that are generated by frequency data generator 6 enable local oscillation signal generators 3-1 to 3-$n$ to generate local oscillation signals that can reproduce frequency error and phase error that are synchronized in common for each of receivers 2-1 to 2-$n$. The local oscillation signals that are generated based on this frequency data can therefore fix the passing phase of signals among receivers 2-1 to 2-$n$. The phase differences between the received signals that have been frequency-converted at each of receivers 2-1 to 2-$n$ are then detected by DSP 8.

Thus, in cases such as an adaptive array antenna system that necessitate the accurate detection of the phase component of received signals that have been received at antennas 1-1 to 1-$n$, the passing phase of signals among receivers 2-1 to 2-$n$ can be fixed and the relative phase fluctuation between demodulated signals therefore indicates the reception delay phase for each of antennas 1-1 to 1-$n$. In other words, this feature stabilizes the operation of an adaptive array antenna system.

Figure 3:
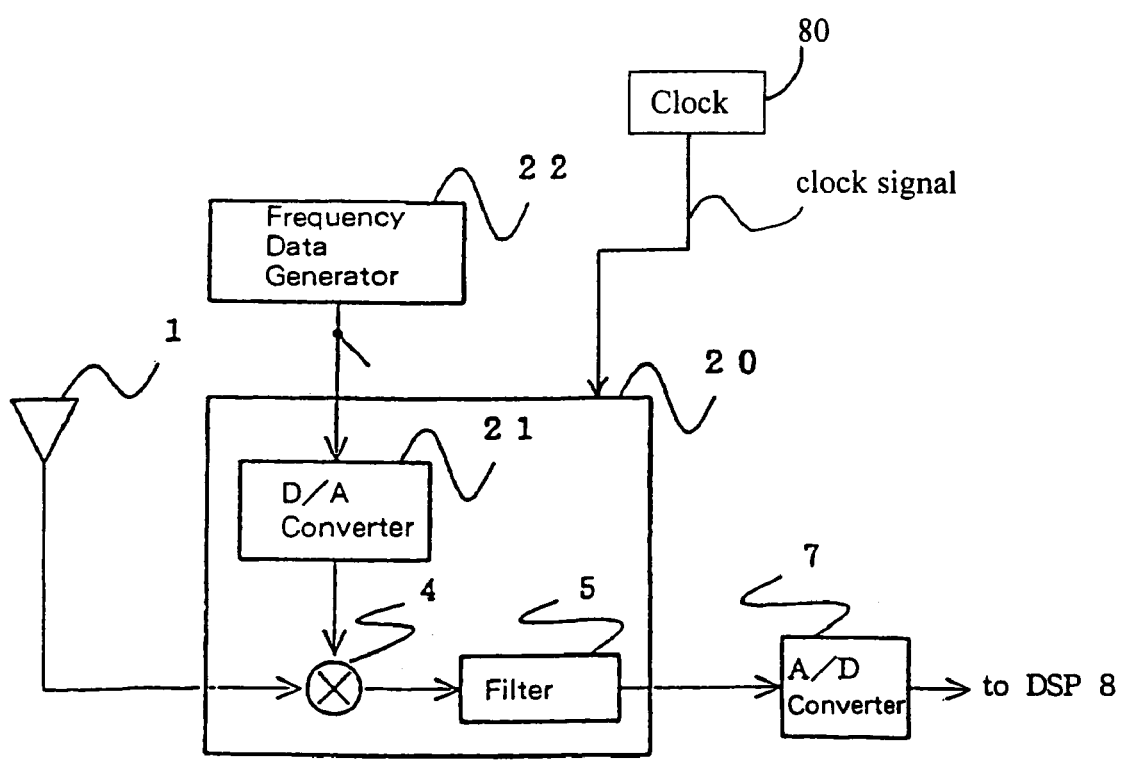
FIG. 3 is a function block diagram showing a specific example of a portion of FIG. 2.

FIG. 3 is a block diagram showing the specific construction of a receiver in the working example shown in FIG. 2. Explanation is here presented with reference to both FIG. 2 and FIG. 3 regarding one case in which local oscillation signals are generated. Antenna 1, mixer 4, filter 5, A/D converter 7, receiver 20, D/A converter 21, and frequency data generator 22 in FIG. 3 correspond to antennas 1-1 to 1-$n$, mixers 4-1 to 4-$n$, filters 5-1 to 5-$n$, A/D converters 7-1 to 7-$n$, receivers 2-1 to 2-$n$, local oscillation signal generators 3-1 to 3-$n$, and frequency data generator 6, respectively, of FIG. 2. In other words, in the example shown in FIG. 3, D/A converter 21 has been adopted as local oscillation signal generator 3-1 to 3-$n$ in FIG. 2.

Although only one receiver 20 is shown in FIG. 3, frequency data generator 22 may supply frequency data constituted by digital signals to the plurality of receivers 20 that are actually provided. In addition, the signal source of the clock signal, which is generated by a clock 80, that is supplied to the digital system is common to all constituent elements including the plurality of receivers 20, and phase error therefore does not occur inside one local oscillation signal supply circuit.

D/A converter 21 of each receiver 20 receives data that are synchronized in common with other receivers by means of frequency data that are supplied from frequency data generator 22, whereby D/A converter 21 generates a waveform. Accordingly, the phase error of local oscillation signals that are outputted by D/A converter 21 can be fixed. In other words, differences in the frequency error and phase error of local oscillation signals among the receivers are prevented in the present embodiment. As a result, the passing phase of demodulated signals among the receivers is fixed, and detection by DSP 8 of the phase differences of received signals that have been received from a plurality of receivers 20 enables the relative phase deviation between the demodulated signals to be reliably determined as the reception delay phase in antenna 1. This reliable determination stabilizes the operation of an adaptive array antenna system.

Figure 4:
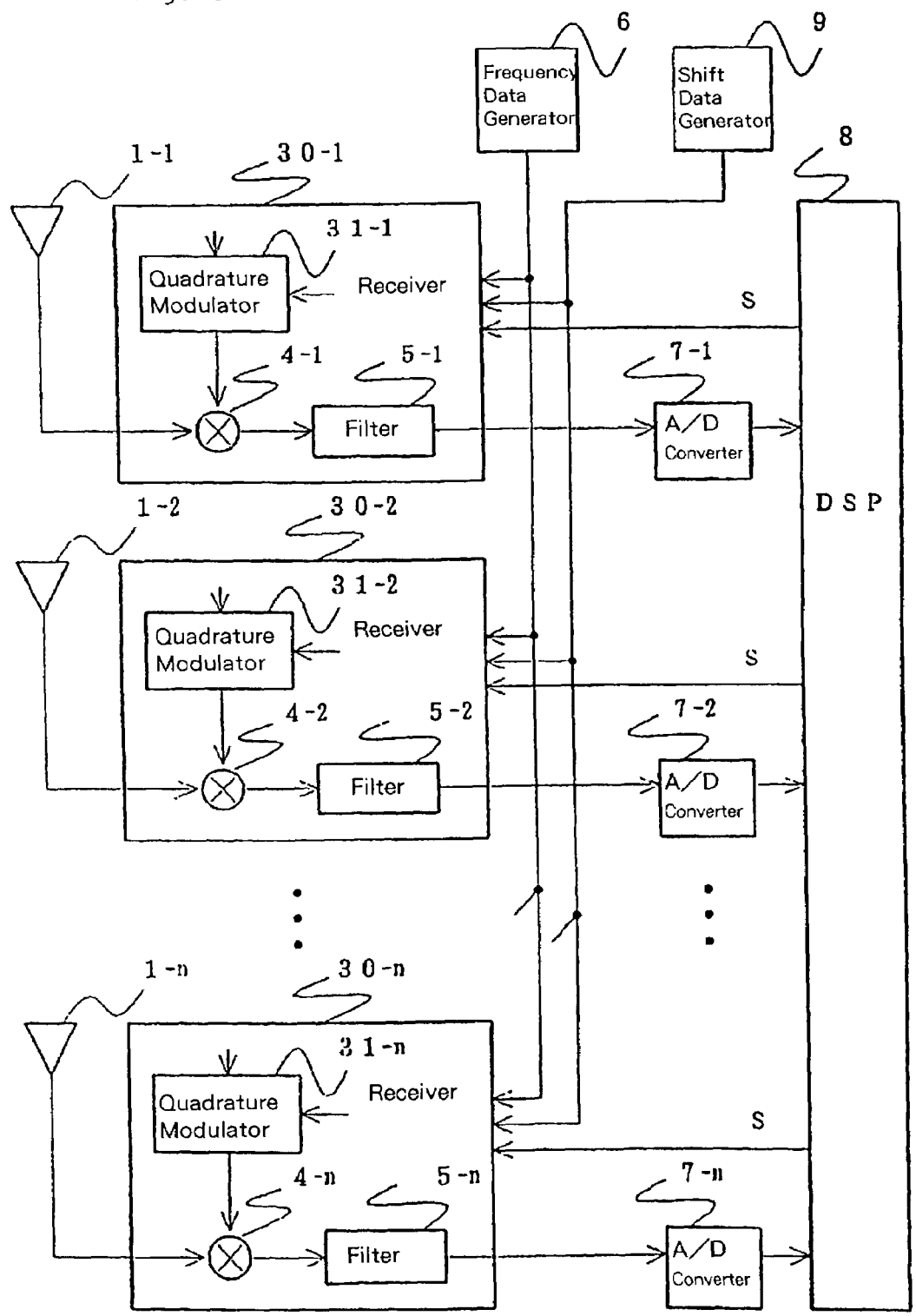
FIG. 4 is a function block diagram showing a specific example in which a function has been added to FIG. 2.

FIG. 4 is a block diagram showing the constitution of a working example in which the functions shown in FIG. 2 and FIG. 3 have been extended, and explanation is next presented regarding the working example shown in FIG. 4.

This working example is capable of realizing frequency conversion at intermediate frequencies that differ for each receiver. The present working example differs from the working example shown in FIG. 3 in that: quadrature modulators 31-1 to 31-$n$ are provided in n receivers 30-1 to 30-$n$, respectively; and shift data generator 9, in addition to frequency data generator 6, generates a number of items of shift data that allows accommodation of all channels of the reception bandwidth and sends these items of shift data to all receivers 30-1 to 30-$n$.

Each of mixers 4-1 to 4-$n$ and filters 5-1 to 5-$n$ that make up receivers 30-1 to 30-$n$, respectively, have the same functions as the components shown in FIG. 2 and redundant explanation regarding these components is omitted.

Quadrature modulators 31-1 to 31-$n$ that are provided in receivers 30-1 to 30-$n$, respectively, receive as input both a signal of basic frequency that is based on frequency data that are supplied from frequency data generator 6 and a signal that is the detuning frequency for the above-described basic frequency and that is shift data that are supplied from shift data generator 9, and quadrature modulators 31-1 to 31-$n$ then perform quadrature modulation of these signals to output local oscillation signals of differing frequencies.

Figure 5:
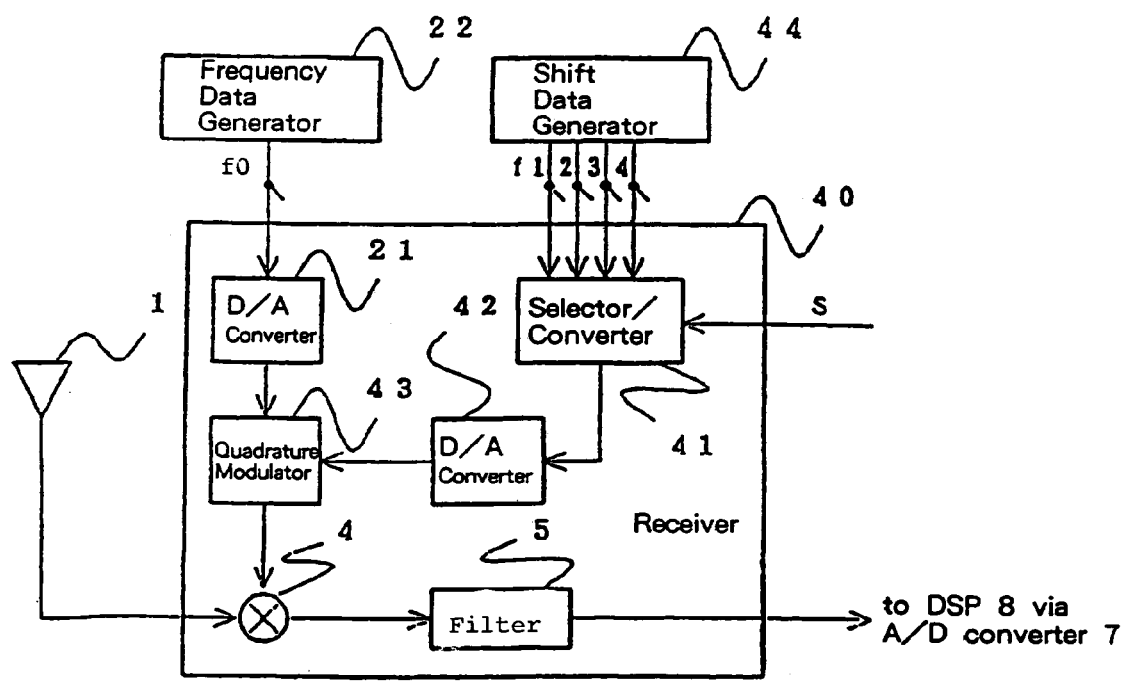
FIG. 5 is a function block diagram showing a specific example of a portion of FIG. 4.

Referring now to FIG. 5, which is a block diagram showing the actual construction of a receiver in the working example shown in FIG. 4, explanation is presented with reference to FIG. 4 and FIG. 5 regarding an example of the generation of local oscillation signals for a case having four channels of local oscillation signals.

Antenna 1, mixer 4, filter 5, receiver 40, frequency data generator 22, and shift data generator 44 in FIG. 5 correspond to antennas 1-1 to 1-$n$, mixers 4-1 to 4-$n$, filters 5-1 to 5-$n$, receivers 30-1 to 30-$n$, frequency data generator 6, and shift data generator 9 in FIG. 4; and D/A converters 21 and 42, selector/converter 41, and quadrature modulator 43 in FIG. 5 correspond to quadrature modulators 31-1 to 31-$n$ in FIG. 4.

Frequency data generator 22 generates a digital signal that indicates basic frequency f0 and outputs this digital signal to quadrature modulator 43 by way of D/A converter 21. A clock is used that is common to D/A converters 21 and 42 that are provided in each of receivers 40.

Shift data generator 44 outputs shift data f1 to f4 to selector/converter 41 that correspond to four types of detuning frequencies. Selector/converter 41 is constituted by a DSP, receives frequency designation signal S that is sent in from DSP 8, selects any of shift data f1 to f4 that correspond to the detuning frequency that is received from shift data generator 44, generates a digital signal that indicates the detuning frequency that corresponds to the selected shift data, and outputs the generated digital signal to quadrature modulator 43 by way of D/A converter 42. In this case, the frequencies that are to be set as the local oscillation signals are 40 MHz, 45 MHz, 50 MHz, and 55 MHz. In this case, the data that frequency data generator 22 sends is a digital signal that indicates that basic frequency f0 is 40 MHz, the detuning frequency is 5 MHz, and the shift data generator 44 sends, as shift data, pulse signals by means of the oscillation frequencies of f1=0 Hz, f2=5 MHz, f3=10 MHz, and f4=15 MHz. These pulse signals that serve as shift data may be generated and outputted using a quartz oscillator. Regarding these pulse signals, the addition of a frequency multiplier allows other frequency pulses of 10 MHz and 15 MHz to be generated by using a frequency pulse of 5 MHz. Thus, although four type of detuning frequencies are considered in FIG. 5, shift data can be easily generated when several tens of detuning frequencies are necessary.

The digital signal that indicates basic frequency f0 that is outputted by frequency generator 22 is converted to an analog signal of basic frequency f0 by D/A converter 21 and applied as input to quadrature modulator 43.

On the other hand, digital signals indicating any of detuning frequencies f1 to f4 that are generated by selector/converter 41 are converted to analog signals indicating any of detuning frequencies f1 to f4 by D/A converter 42 and applied as input to quadrature modulator 43.

Quadrature modulation data for the basic frequency are thus generated in quadrature modulator 43.

Essentially, a signal that is generated at frequency data generator 22 and obtained by way of D/A converter 21 is made the carrier wave, a signal that is obtained by way of D/A converter 42 is made the frequency component that shifts a non-modulated frequency, and quadrature modulation is performed at quadrature modulator 43 to enable local oscillation signals having different frequencies to be obtained at each of the plurality of receivers 40 that are actually provided (although only one receiver 40 is shown in the figure).

There is no particular limitation on the modulation method, but in the case of π/4 shift QPSK modulation, when selector/converter 41 selects, for example, shift data f2, a shift amount of 5 MHz is generated as the generated data, and for amplitude modulation, all "0" data indicating 0 are given.

Figure 6:
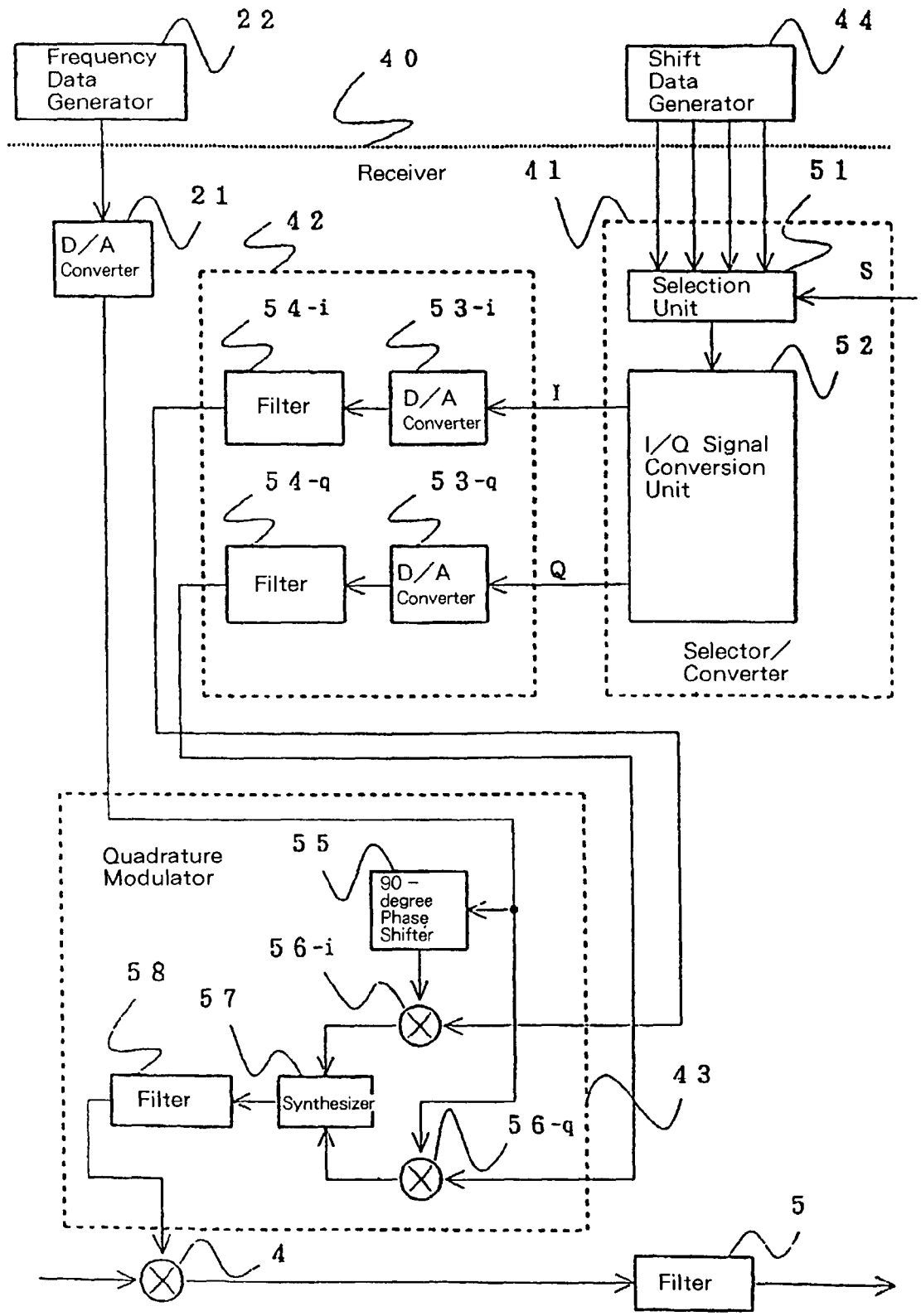
FIG. 6 is a function block diagram showing a detailed specific example of FIG. 5.

FIG. 6 is a block diagram that gives a more detailed representation of the constitution of the receiver in the working example shown in FIG. 5, and an explanation of the generation of local oscillation signal is next given with reference to FIG. 6.

Selector/converter 41 in FIG. 6 is provided with selection unit 51 and I/Q signal conversion unit 52; D/A converter 42 is provided with D/A conversion units 53-*i* and 53-*q* and filters 54-*i* and 54-*q*; and quadrature modulator 43 is provided with 90-degree phase shifter 55, mixers 56-*i* and 56-*q*, synthesizer 57, and filter 58.

Four-channel shift data that are supplied from shift data generator 44 are applied as input to selection unit 51 of selector/converter 41. Selection unit 51 sends shift data, which are designated by frequency designation signal S that is sent in from DSP 8 shown in FIG. 4, to I/Q signal conversion unit 52.

I/Q signal conversion unit 52 converts shift data that have been received from selection unit 51 to a data format that allows processing in D/A converter 42 and quadrature modulator 43, separates the data into an I (in-phase) signal and Q (quadrature) signal, and outputs to D/A conversion units 53-*i* and 53-*q*, respectively.

The digital signals that have been received in D/A conversion units 53-*i* and 53-*q* are converted to analog signals and outputted to filters 54-*i* and 54-*q*, respectively. The clock component that is contained in the analog signal outputs of D/A conversion units 53-*i* and 53-*q* and that was used in D/A conversion units 53-*i* and 53-*q* is removed in filters 54-*i* and 54-*q*, and the resulting signals are outputted to mixers 56-*i* and 56-*q*. The clock that is used in common in the above-described receivers 40 is also used in D/A conversion units 53-*i* and 53-*q* to make the phase error identical.

Based on frequency data that have been generated in frequency data generator 22, the signal of basic frequency f0 that is outputted as an analog signal is received as the carrier wave in quadrature modulator 43 by passing by way of D/A converter 21. The carrier wave, which is a signal of basic frequency f0, is applied as input to each of mixers 56-*i* and 56-*q*, but the signal that is applied to mixer 56-*i* passes by way of 90-degree phase shifter 55 and is received as a 90-degree phase-shifted signal, and the signal that is applied to mixer 56-*q* is received as a signal without phase shifting.

Using these carrier waves, the I-signal that is outputted from filter 54-*i* is subjected to quadrature modulation in mixer 56-*i*, and the Q-signal that is outputted from filter 54-*q* is subjected to quadrature modulation in mixer 56-*q*. The outputs of each of mixers 56-*i* and 56-*q* are outputted to synthesizer 57, and the I-signal and Q-signal are synthesized by synthesizer 57.

The synthesis results in synthesizer 57 are applied as input to filter 58, which allows the passage of the synthesis result signal and all of the channel signals that are employed, and then, as a result of passage through this filter 58, the synthesis results are outputted to mixer 4 as a local oscillation signal in which unwanted radiation has been suppressed. At this time, filter 58 simultaneously removes the component of the carrier wave received from frequency data generator 22 that remained as a carrier leak.

Finally, explanation is given regarding I/Q signal conversion unit 52 that performs data conversion using a DSP.

When, for example, shift data f2 are designated by frequency designation signal S, the shift amount in I/Q signal conversion unit 52 is 5 MHz; and for amplitude modulation, data that are all "0" data that indicate 0 and that generate I/Q data that rotate the locus of an equal-amplitude circle at 5 MHz on the I-plane and Q-plane are outputted to D/A converter 42. In other words, data on the I-plane are outputted as the I-signal and data on the Q-plane are outputted as the Q-signal to D/A converter 42.

Quadrature modulator 43 performs quadrature modulation and synthesis of the carrier wave having a basic frequency f0=40 MHz that is outputted by D/A converter 21 and the I/Q signal that is outputted by D/A converter 42 to generate a local oscillation signal of 45 MHz.

The various types of data for generating the carrier wave and I/Q signal of detuning frequency that are used in the receivers of this working example are created by a data generator and clock that are common to each of the receivers. As a result, phase differences of the local oscillation signals that are generated in each receiver theoretically do not exist. In particular, the phase differences between receivers that have selected the same frequency channel are reliably fixed. Because the signal sources that generate local oscillation signals are all shared and the phase differences of the received signals that are received at each antenna can be fixed, the present invention is capable of stabilizing an adaptive array antenna system.

Although the foregoing explanation was presented with reference to the function blocks shown in figures, the present invention is not limited by the above-described explanation and alterations to the block structure that are realized by separating or combining functions may be made as long as the above-described functions are realized.

The present invention as described in the foregoing explanation can provide the following effects:

As the first effect, in a circuit, the generation of local oscillation signals having the same phase error in each of a plurality of receivers based on data and clocks that are synchronized in common allows the relative phase error between local oscillation signals generated in all receivers to be fixed, whereby the passing phase of receivers is also fixed.

As the second effect, the generation of signals and data that are synchronized in common by digital processing enable a construction that is added that is of smaller scale than the common synthesizer method.

What is claimed is:

1. A local oscillation signal supply method that is used when received signals, which are received as input by way of a plurality of receivers that are each connected to respective antennas, are demodulated and outputted by a digital signal processor, the method comprising:

generating frequency data that contain a frequency component;

sending said frequency data as a common signal source to each of said plurality of receivers via signal sequences that correspond to a wireless channel, the signal source supplied as a digital signal;

in each of said receivers, converting the digital signal to an analog signal based on a clock signal that is common to all of said receivers; and in each of said receivers, generating local oscillation signals in which phase and amplitude are matched in all of said receivers based on said analog signal, wherein the frequency data that are received from the plurality of said signal sequences are each subjected to quadrature amplitude modulation to generate respective of the local oscillation signals having a prescribed frequency.

2. A local oscillation signal supply method that is used when received signals, which are received as input by way of a plurality of receivers that are each connected to respective antennas, are demodulated and outputted by a digital signal processor, the method comprising:

generating frequency data that contain a frequency component;

sending said frequency data as a common signal source to each of said plurality of receivers via signal sequences that correspond to a wireless channel, the signal source supplied as a digital signal;

providing a plurality of said signal sequences supplying shift data, which correspond to phase advance data for said frequency data, to all of said receivers;

in each of said receivers, converting the digital signal to an analog signal based on a clock signal that is common to all of said receivers;

in each of said receivers, generating local oscillation signals in which phase and amplitude are matched in all of said receivers based on said analog signal, wherein, in each of said receivers, shift data, in which a prescribed frequency is obtained from each of said plurality of signal sequences, are selected and subjected to signal conversion, and shift data that have undergone selection and conversion and said frequency data are subjected to quadrature modulation to generate respective of the local oscillation signals having a prescribed frequency.

3. A local oscillation signal supply circuit that is used when received signals, which are received as input by a plurality of receivers that are each connected to respective antennas, are demodulated and outputted by a digital signal processor, said local oscillation signal supply circuit comprising:

a single frequency data generator that generates frequency data that contain a frequency component and sends these data as a common signal source as digital signals to each of said plurality of receivers by way of a single signal sequence that corresponds to a wireless channel; and a local oscillation signal generator at each of the receivers including:

a digital/analog converter that converts said digital signals to analog signals based on a clock signal that is common to all of said receivers; and a quadrature modulator that performs quadrature modulation of said analog signals to generate a local oscillation signal having a prescribed frequency, in which phase and amplitude are matched at all of said receivers based on said analog signals.

4. A local oscillation signal supply circuit that is used when received signals, which are received as input by a plurality of receivers that are each connected to respective antennas, are demodulated and outputted by a digital signal processor, said local oscillation signal supply circuit comprising:

a single frequency data generator that generates frequency data that contain a frequency component and sends these data as a common signal source as digital signals to each of said plurality of receivers by way of a single signal sequence that corresponds to a wireless channel;

a shift data generator that provides a plurality of signal sequences for outputting shift data corresponding to phase advance data for said frequency data, to all of said receivers; and a local oscillation signal generator at each of the receivers including:

a digital/analog converter that converts said digital signals to analog signals based on a clock signal that is common to all of said receivers;

a selector/converter that selects from the shift data and signal-converts the selected shift data, from which a desired frequency is obtained from the plurality of said signal sequences; and a quadrature modulator that performs quadrature modulation of shift data that have undergone selection and conversion and said analog signal to generate a local oscillation signal having a desired frequency, in which phase and amplitude are matched at all of said receivers based on said analog signals.

* * * * *